United States Patent [19]

Cohn et al.

[11] Patent Number: 5,448,718
[45] Date of Patent: Sep. 5, 1995

[54] METHOD AND SYSTEM FOR TIME ZERO BACKUP SESSION SECURITY

[75] Inventors: Oded Cohn, Haifa, Israel; William F. Micka; Kenneth M. Nagin, both of Tucson, Ariz.; Yoram Novick; Alexander Winokur, both of Haifa, Israel

[73] Assignee: International Business Machines Corporation, Armonk, N.Y.

[21] Appl. No.: 871,358

[22] Filed: Apr. 20, 1992

[51] Int. Cl.⁶ ............................................. G06F 11/20
[52] U.S. Cl. .................................... 395/404; 395/600; 395/728; 364/268; 364/268.3; 364/285.1; 364/DIG. 1
[58] Field of Search ................ 395/650, 700, 575, 600

[56] References Cited

U.S. PATENT DOCUMENTS

| | | | |
|---|---|---|---|
| 5,089,958 | 2/1972 | Horton et al. | 395/575 |
| 5,210,866 | 5/1993 | Milligan et al. | 395/575 |
| 5,241,668 | 8/1993 | Eastridge et al. | 395/575 |
| 5,241,669 | 8/1993 | Cohn et al. | 395/575 |
| 5,241,670 | 8/1993 | Eastridge et al. | 395/575 |
| 5,263,154 | 11/1993 | Eastridge et al. | 395/575 |

*Primary Examiner*—Thomas M. Heckler
*Assistant Examiner*—John Q. Chavis
*Attorney, Agent, or Firm*—Manny W. Schecter; Andrew J. Dillon

[57] ABSTRACT

A data backup copying session on a data processing system is secured responsive to initiation of the data backup session by an application executing on a processing unit by generating a unique identifier for the data backup session. Thereafter, all member paths of a group of paths designated by the processing unit for communication between itself and the first storage subsystem are identified and associated with the data backup session. Access to the session is thereafter allowed only along a member path of the group of paths associated with the data backup session. The system and method of the invention further provide for fault recovery and protection against excessive demand on storage control unit memory.

14 Claims, 4 Drawing Sheets

METHOD AND SYSTEM FOR TIME ZERO BACKUP SESSION SECURITY

CROSS-REFERENCE TO RELATED APPLICATION

The present application is related to U.S. patent application Ser. No. 07/781,044, now abandoned, entitled Method and Means for Time Zero Backup Copying of Data, filed Oct. 18, 1991, and assigned to the assignee herein named. The contents of the cross-reference United States Patent Application are hereby incorporated herein by reference thereto.

BACKGROUND OF THE INVENTION

1. Technical Field

This invention relates in general to methods and systems for maintaining continued availability of datasets in external storage associated with accessing data processing systems, and in particular the present invention relates to backup copying of records in external storage concurrent with a dramatically shortened suspension of data processing system application execution occasioned by such copying. Still more particularly, the present invention relates to a method and system for providing backup session secured to a single one of the plurality of accessing data processing systems.

2. Description of the Related Art

A modern data processing system must be prepared to recover, not only from corruptions of stored data which occur as a result of noise bursts, software bugs, media defects, and write path errors, but also from global events, such as data processing system power failure. The most common technique of ensuring the continued availability of data within a data processing system is to create one or more copies of selected datasets within a data processing system and store those copies in a nonvolatile environment. This so-called "backup" process occurs within state-of-the-art external storage systems in modern data processing systems.

Backup policies are implemented as a matter of scheduling. Backup policies have a space and time dimension which is exemplified by a range of datasets and by the frequency of backup occurrence. A FULL backup requires the backup of an entire range of a dataset, whether individual portions of that dataset have been updated or not. An INCREMENTAL backup copies only that portion of the dataset which has been updated since a previous backup, either full or incremental. The backup copy thus created represents a consistent view of the data within the dataset as of the time the copy was created.

Of course, those skilled in the art will appreciate that as a result of the process described above, the higher the backup frequency, the more nearly the backup copy will mirror the current state of data within a dataset. In view of the large volumes of data maintained within a typical state-of-the-art data processing system backing up that data is not a trivial operation. Thus, the opportunity cost of backing up data within a dataset may be quite high on a large multiprocessing, multiprogramming facility, relative to other types of processing.

Applications executed within a data processing system are typically executed in either a batch (streamed) or interactive (transactional) mode. In a batch mode, usually one application at a time executes without interruption. Interactive mode is characterized by interrupt driven multiplicity of applications or transactions.

When a data processing system is in the process of backing up data in either a streamed or batch mode system, each process, task or application within the data processing system is affected. That is, the processes supporting streamed or batch mode operations are suspended for the duration of the copying. Those skilled in the art will recognize that this event is typically referred to as a "backup window." In contrast to batch mode operations, log based or transaction management applications are processed in the interactive mode. Such transaction management applications eliminate the "backup window" by concurrently updating an on-line dataset and logging the change. However, this type of backup copying results in a consistency described as "fuzzy." That is, the backup copy is not a precise "snapshot" of the state of a dataset/data base at a single point in time. Rather, a log comprises an event file requiring further processing against the database.

A co-pending U.S. patent application Ser. No. 07/385,647, filed Jul. 25, 1989, entitled A Computer Based Method For Dataset Copying Using an Incremental Backup Policy, illustrates backup in a batch mode system utilizing a modified incremental policy. A modified incremental policy copies only new data or data updates since the last backup. It should be noted that execution of applications within the data processing system are suspended during copying in this system.

As described above, to establish a prior point of consistency in a log based system, it is necessary to "repeat history" by replaying the log from the last check point over the datasets or database of interest. The distinction between batch mode and log based backup is that the backup copy is consistent and speaks as of the time of its last recordation, whereas the log and database mode require further processing in the event of a fault, in order to exhibit a point in time consistency.

U.S. Pat. No. 4,507,751, Gawlick et al., entitled *Method and Apparatus for Logging Journal Data Using a Write Ahead Dataset,* issued Mar. 25, 1985, exemplifies a transaction management system wherein all transactions are recorded on a log on a write-ahead dataset basis. As described within this patent, a unit of work is first recorded on the backup medium (log) and then written to its external storage address.

Co-pending U.S. patent application Ser. No. 07/524,206, filed May 16, 1990, entitled *Method and Apparatus for Executing Critical Disk Access Commands,* teaches the performance of media maintenance on selected portions of a tracked cyclic operable magnetic media concurrent with active access to other portions of the storage media. The method described therein requires the phased movement of customer data between a target track to an alternate track, diversion of all concurrent access requests to the alternate track or tracks and the completion of maintenance and copy back from the alternate to the target track.

Requests and interrupts which occur prior to executing track-to-track customer data movement result in the restarting of the process. Otherwise, requests and interrupts occurring during execution of the data movement view a DEVICE BUSY state. This typically causes a requeueing of the request.

Where data base systems support access in an interactive mode by a plurality of host data processing systems, a request for generation of a backup copy can come from one or more of the host data processing systems, or from one or more applications running on a single host. The techniques described above add to the robustness of a data base, but do not directly address complications faced by a data base server in producing a faithful back up copy in the face of the possibility of requests from more than source.

It should therefore be apparent that a need exists for a method and system whereby the maximum availability of application execution within a data processing system is maintained while creating backup copies which exhibit a consistent view of data within an associated database, as of a specific time.

SUMMARY OF THE INVENTION

It is therefore one object of the present invention to provide an improved method and system for maintaining continued availability of datasets in external storage associated with accessing data processing systems.

It is another object of the present invention to provide an improved method and system for backup copying of data in external storage concurrent with continued execution of a plurality of applications on several processing units within the data processing system that access data.

It is still another object of the present invention to provide an improved method and system for securing a backup copying session to a single one of a plurality of processing units.

The foregoing objects are achieved as is now described. A data backup copying session on a data processing system is secured responsive to initiation of the data backup session by an application executing on a processing unit by generating a unique identifier for the data backup session. Thereafter, all member paths of a group of paths designated by the processing unit for communication between itself and the first storage subsystem are identified and associated with the data backup session. Access to the session is thereafter allowed only along a member path of the group of paths associated with the data backup session.

The system and method of the invention further provide for fault recovery and protection against excessive demand on storage control unit memory. Upon initiation of a data backup copying session, a session file in subsystem storage of a storage control unit for the data backup session is generated. Responsive to a session file exceeding a limit in size, the data backup session is terminated. The limit imposed is dynamically adjusted as a function of a number of concurrent data backup sessions and the size of the concurrent data backup sessions. The session having the session file demanding the greatest range in the subsystem storage when total subsystem storage demand exceeds a certain threshold terminated.

A variety of fault recovery techniques are provided. Responsive to the processing unit resetting all member paths of the group of paths designated initially by the processing unit, a data backup session is terminated. Responsive to reinitialization of the processing unit, a data backup session is terminated.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
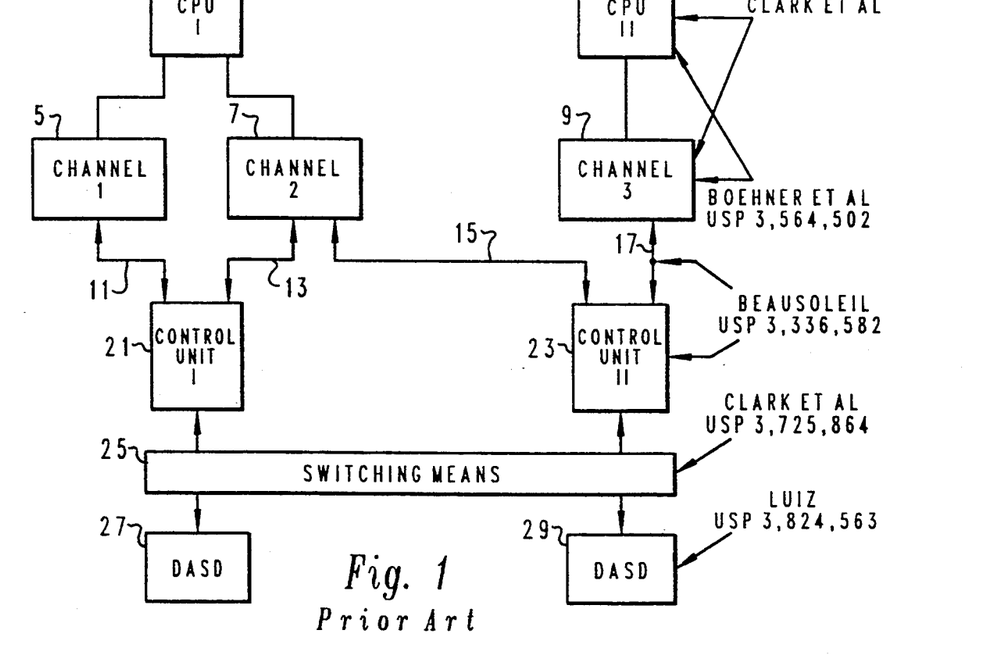
FIG. 1 depicts a typical multiprocessing, multiprogramming environment according to the prior art where executing processors and applications randomly or sequentially access data from external storage.

With reference now to the figures and in particular with reference to FIG. 1, there is depicted a multiprocessing, multiprogramming data processing system according to the prior art. Such systems typically include a plurality of processor units 1 and 3 which access external storage units 21, 23, 25, 27, and 29 over redundant channel demand/response interfaces 5, 7 and 9.

The illustrated embodiment in FIG. 1 may be provided in which each processor within the data processing system is implemented utilizing an IBM/360 or 370 architected processor type having, as an example, an IBM MVS operating system. An IBM/360 architected processor is fully described in Amdahl et al., U.S. Pat. No. 3,400,371, entitled *Data Processing System*, issued on Sep. 3, 1968. A configuration in which multiple processors share access to external storage units is set forth in Luiz et al., U.S. Pat. No. 4,207,609, entitled *Path Independent Device Reservation and Reconnection in a Multi-CPU and Shared Device Access System*, issued Jan. 10, 1980.

The MVS operating system is also described in IBM Publication GC28-1150, entitled *MVS/Extended Architecture System Programming Library: System Macros and Facilities*, Vol. 1. Details of standard MVS or other operating system services, such as local lock management, subsystem invocation by interrupt or monitor, and the posting and waiting of tasks is omitted. These operating systems services are believed to be well known to those having skill in this art.

Still referring to FIG. 1, as described in Luiz et al., a processor process may select from one or more paths previously established by the processor to externally stored data in an IBM System 370 or similar system through an MVS or other known operating system by invoking a START I/O, transferring control to a channel subsystem which reserves a path to the data over which transfers are made. Typically, executing applications have data dependencies and may briefly suspend operations until a fetch or update has been completed. During such a transfer, the path is locked until the transfer is completed.

Figure 2A:
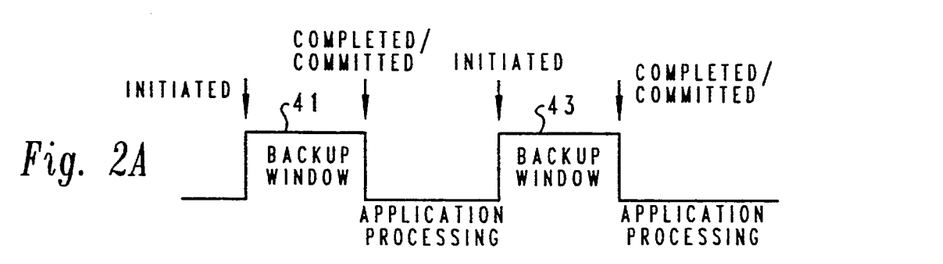
FIGS. 2A–2C depict time line illustrations of the backup window in a batch or streaming process in the prior art, in a time zero backup system and in an incremental time zero backup system, respectively.
Figure 2B:
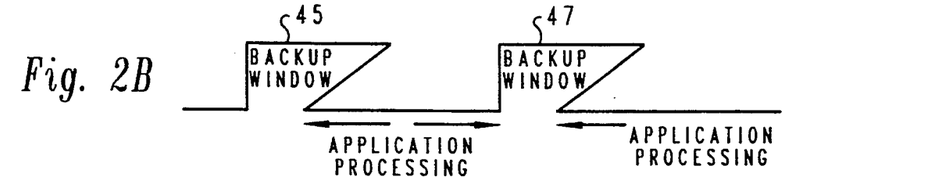
Figure 2C:
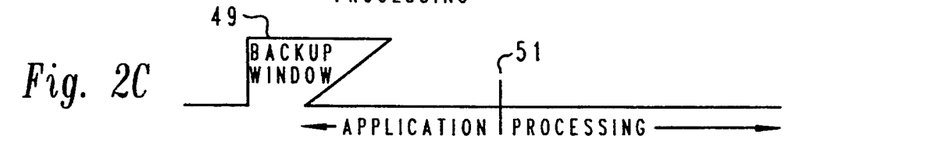

Referring now to FIGS. 2A–2C, there are depicted time lines illustrating the backup window in a batch or streaming process in the prior art, in a time zero backup system and in an incremental time zero backup system respectively. As illustrated at FIG. 2A, multiple backup operations have occurred, as indicated at backup windows 41 and 43. Application processing is typically suspended or shut down just prior to each backup window and this suspension will persist until the backup process has been completed. Termination of the backup window signifies completion of the backup process and commitment. By "completion" what is meant is that all data that was to have been copied was in fact read from the source. By "commitment" what is meant is that all data to be copied was in fact written to an alternate storage location.

Referring now to FIG. 2B, backup windows for a time zero backup copy system are depicted. As described in detail within the co-pending crossreferenced patent application, each backup window 45 and 47 still requires the suspension or termination of application processing; however, the suspension or termination occurs only for a very short period of time. As described in the cross-referenced application, the time zero backup method begins, effectively freezing data within the datasets to be backed up at that point in time. Thereafter, a bit map is created identifying each track within the datasets to be backed up and after creation of that bit map, the copy is said to be "logically complete." The committed state, or "physically complete" state will not occur until some time later. However, at the "logically complete" point in time, the data is completely usable by applications within the data processing system. The time during which application processing is suspended in such a system is generally in the low sub-second range; however, those skilled in the art will appreciate that the amount of time required to create a bit map to the data to be copied will depend upon the amount of data within the datasets.

Of course, those skilled in the art will appreciate that if the time zero backup process terminates abnormally between the point of logical completion and the point of physical completion, the backup copy is no longer useful and the process must be restarted. In this respect, the time zero backup process is vulnerable in a manner very similar to that of backup systems in the prior art. That is, all backup operations must be rerun if the process terminates abnormally prior to completion. Recovery from abnormal termination must also address security aspects of the backup procedure.

Referring now to FIG. 2C, the incremental time zero backup copying process is depicted. As above, an initial backup window 49 exists which requires a temporary suspension or termination of application processing; however, in a manner which will be explained in greater detail herein, updates to the dataset which occur after the initial backup copy has begun are tracked utilizing an alternate bit map of the designated dataset. Thereafter, only those tracks within the designated dataset which have been altered are copied during a subsequent incremental copy session. Since the creation of a bit map identifying those tracks within the dataset which have been updated since a previous full copy has been completed occurs during the update process, application processing need not be suspended until the next time a full copy is desired. In this manner, suspension or interruption of application processing is substantially reduced.

Figure 3:
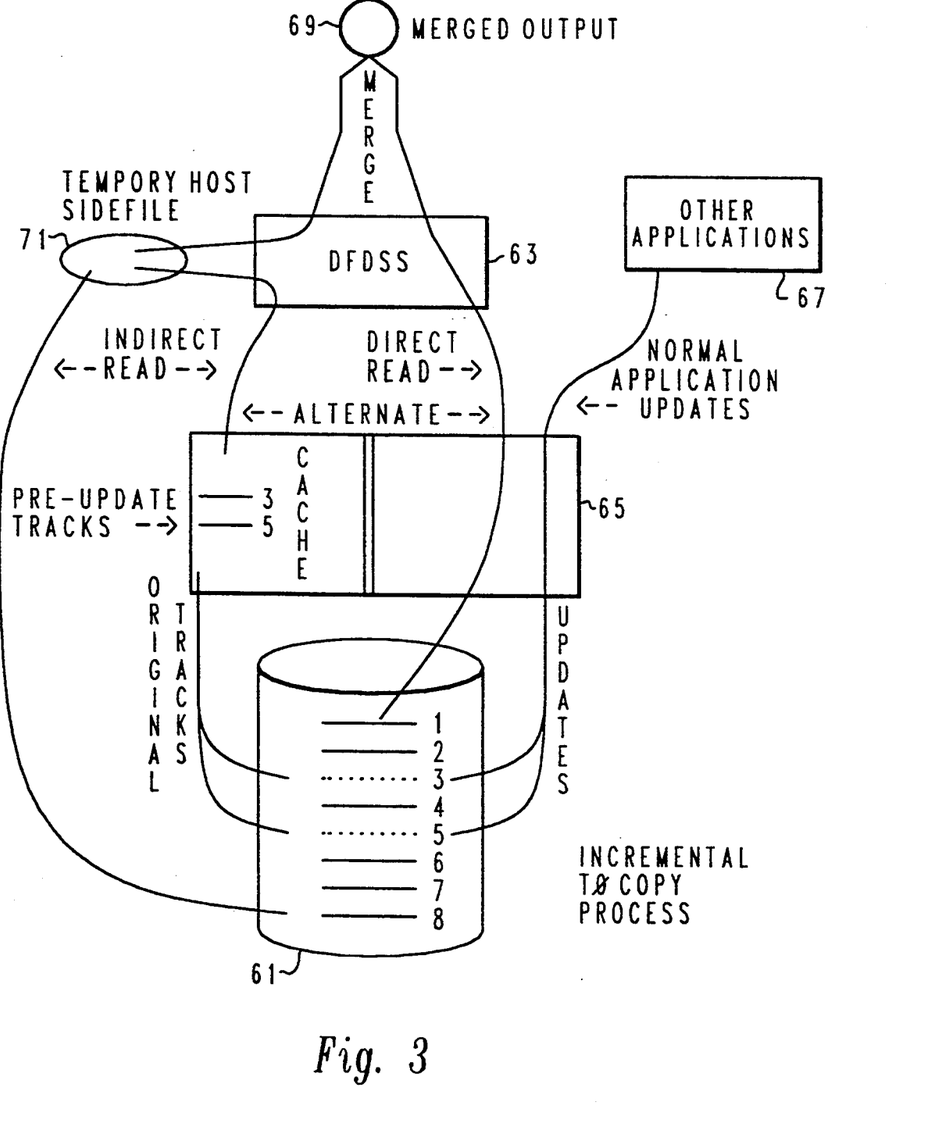
FIG. 3 illustrates a conceptual flow of an incremental time zero backup copy.

With reference now to FIG. 3, there is depicted a conceptual flow of the creation of an incremental time zero backup copy in accordance with the method and system of the present invention. As illustrated, a incremental time zero backup copy of data within a tracked cyclic storage device 61 may be created. As those skilled in the art will appreciate, data stored within such a device is typically organized into records and datasets. The real address of data within external storage is generally expressed in terms of Direct Access Storage Device (DASD) volumes, cylinders and tracks. The virtual address of such data is generally couched in terms of base addresses and offsets and/or extents from such base addresses.

Further, a record may be of the count-key data format. A record may occupy one or more units of real storage. A "dataset" is a logical collection of multiple records which may be stored on contiguous units of real storage or which may be dispersed. Therefore, those skilled in the art will appreciate that if backup copies are created at the dataset level it will be necessary to perform multiple sorts to form inverted indices into real storage. For purposes of explanation of this invention, backup processing will be described as managed both at the resource manager level within a data processing system and at the storage control unit level.

As described above, each processor typically includes an operating system which includes a resource manager component. Typically, an IBM System 370 type processor running under the MVS operating system will include a resource manager of the data facilities dataset services (DFDSS) type which is described in U.S. Pat. No. 4,855,907, Ferro et al., issued Aug. 8, 9189, entitled *Method for Moving VSAM Base Clusters While Maintaining Alternate Indices Into the Cluster.* DFDSS is also described in IBM Publication GC26-4388, entitled *Data Facility Dataset Services: User's Guide.* Thus, a resource manager 63 is utilized in conjunction with a storage control unit 65 to create an incremental backup copy of designated datasets stored within tracked cyclic storage device 61.

As will be described below, the backup copy process includes an initialization period during which datasets are sorted, one or more bit maps are created and logical completion of the bit map is signaled to the invoking process at the processor. The backup copy process is also secured to the host processing unit on which the initiating process is executing. The listed or identified datasets are then sorted according to access path elements down to DASD track granularity. Next, bit maps are constructed which correlate the dataset and the access path insofar as any one of them is included or excluded from a given copy session. Lastly, storage manager 63 signals logical completion, indicating that updates will be processed against the dataset only after a short delay until such time as physical completion occurs.

Following initialization, storage manager 63 begins reading the tracks of data which have been requested. While a copy session is active, each storage control unit monitors all updates to the dataset. If an update is received from another application 67, storage control unit 65 will execute a predetermined algorithm to process that update, as described below. Access to the session is however, limited along paths owned by the initiating processing unit.

In a time zero backup copy system a determination is first made as to whether or not the update attempted by application 67 is for a volume which is not within the current copy session. If the volume is not within the current copy session, the update completes normally. Alternately, if the update is for a volume which is part of the copy session, the primary session bit map is checked to see if that track is protected. If the corresponding bit within the bit map indicates the track is not currently within a copy session (e.g. the bit is off), the update completes normally. However, if the track is protected (e.g. the bit is on) the track in question is part of the copy session and has not as yet been read by the storage manager 63. In such a case, storage control unit temporarily buffers or defers the update and writes a copy of the affected track from tracked cyclic storage device 61 into a memory within storage control unit 10 Thereafter, the update is permitted to complete.

Thus, as illustrated in FIG. 3, an update initiated by application 67 may be processed through storage control unit 65 to update data at tracks 3 and 5 within tracked cyclic storage unit 61. Prior to permitting the update to occur, tracks 3 and 5 are written as sidefiles to a memory within storage control unit 65 and thereafter, the update is permitted to complete. The primary bit map is then altered to indicate that the copies of tracks 3 and 5, as those tracks existed at the time a backup copy was requested, are no longer within tracked cyclic storage device 61 but now reside within a memory within storage control unit 65.

A merged copy, representing the designated dataset as of the time a backup copy was requested, is then created at reference numeral 69, by copying nonupdated tracks directly from tracked cyclic storage device 61 through resource manager 63, or by indirectly copying those tracks from tracked cyclic storage device 61 to a temporary host sidefile 71, which may be created within the expanded memory store of a host processor. Additionally, tracks within the dataset which have been written to sidefiles within a memory in storage control unit 65 prior to completion of an update may also be indirectly read from the memory within storage control unit 65 to the temporary host sidefile 71. Those skilled in the art will appreciate that in this manner a copy of a designated dataset may be created from unaltered tracks within tracked cyclic storage device 61, from updated tracks stored within memory of storage control unit 65 and thereafter transferred to temporary host sidefile 71, wherein these portions of the designated dataset may be merged in backup copy order, utilizing the bit map which was created at the time the backup copy was initiated.

Figure 4:
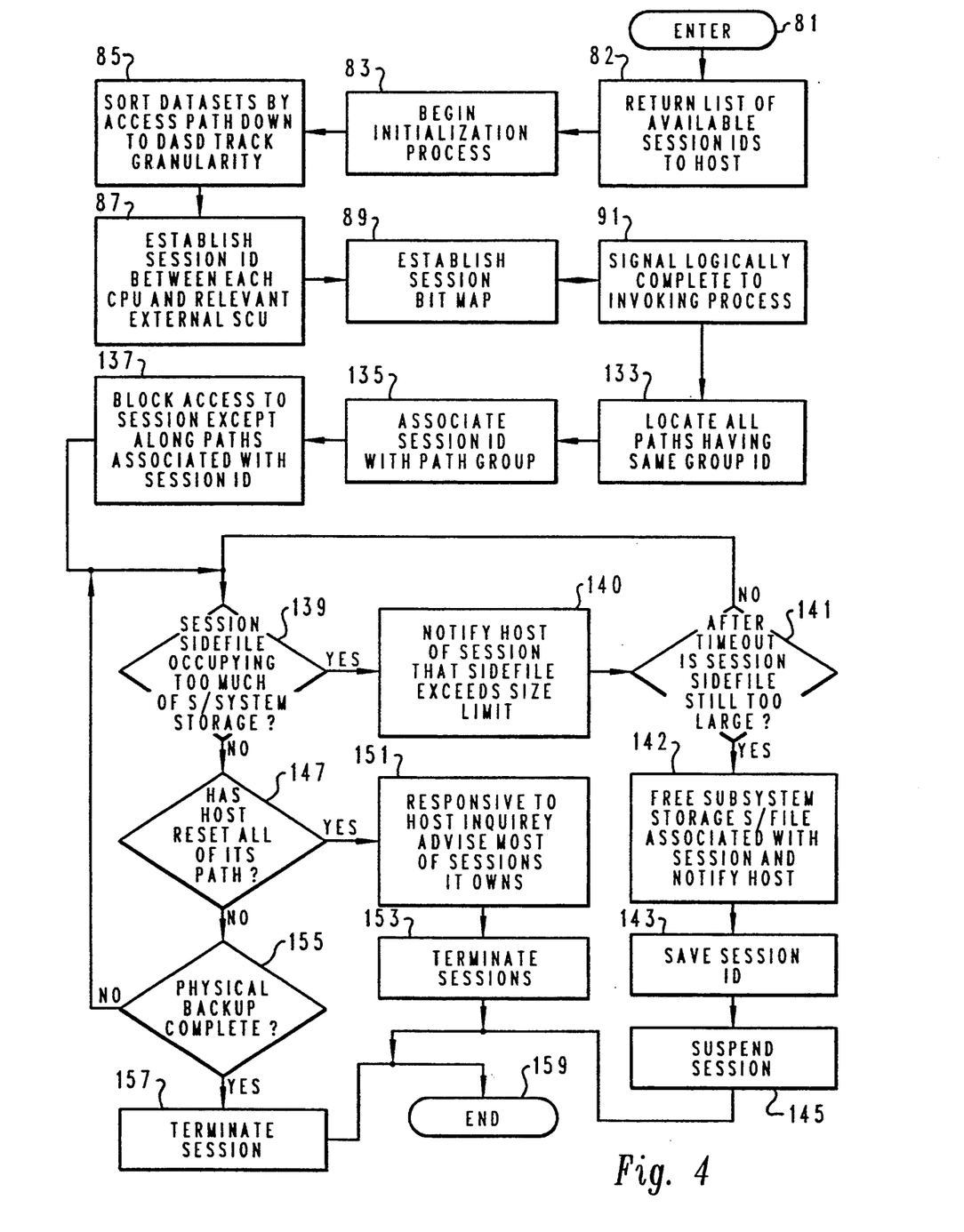
FIG. 4 is a high level logic flowchart illustrating initialization of an incremental time zero backup copy and securing of a session of incremental backup copying in accordance with the method and system of the present invention.

Referring now to FIG. 4, there is depicted a high level logic flowchart which illustrates the initialization of a process for creating an incremental time zero backup copy, in accordance with the method and system of the present invention. As illustrated, this process starts at block 81. Block 82 returns a list of available session IDs to a processor unit upon request. Thereafter the process passes to block 83 which illustrates the beginning of the initialization process. Thereafter, the process passes to block 85 which depicts the sorting of the datasets by access path, down to DASD track granularity. This sorting process will, necessarily, resolve an identification of the DASD volumes within which the datasets reside and the identification of the storage control units to which those volumes belong.

Next, as depicted at block 87, a session identification is established between each processor and the relevant external storage control units. The session identification is preferably unique across all storage control units, in order that multiple processors will not interfere with each others' backup copy processes. Thereafter, as illustrated at block 89, a primary session bit map is established which may be utilized, as set forth in detail herein and within the cross-referenced patent application, to indicate whether or not a particular track is part of the present copy session. Thereafter, as depicted at block 91, the "logically complete" signal is sent to the invoking process, indicating that application processing may continue; however, slight delays in updates will occur until such time as the backup copy is physically complete. Security aspects of the process are invoked as required.

Securing of the data backup session begins with execution of step 133, which is executed to locate all paths between the host processing unit of the initiating application and the external storage units of the data processing system. A path group identification is unique to a host even across a multiple processing unit data processing system. Next, at step 135 the session ID is associated with the group of paths located in step 133. The session ID is utilized as a tag for all acceptable paths for access to the session. Thereafter, as indicated with step 137, access to the data backup copying session on any path but those paths associated with session ID is blocked.

The system and method of the present invention further provide protection against excessive commitment of storage control unit memory. The extent of memory commitment is monitored As described above, each data backup copying session has a dedicated session sidefile in storage control unit memory. The extent of memory commitment is monitored by the time zero resource manager, which returns, among other measures, a variable indicating the extent of maximum memory utilization. This threshold is set for the sidefile as a whole. When the session sidefiles exceed the threshold level of total memory capacity (step 139), the session sidefile occupying the greatest number of tracks is identified to its host (step 140). If the host does not respond by removing sufficient data within a time out period (step 141), notification is given of suspension of the session (step 142). Suspension or disestablishment of a session is essentially termination except that the session ID does not become available for reassignment. Step 143 illustrates that the session ID is not returned to the available list notwithstanding suspension of the session (step 145). This allows the host processing unit to perform housecleaning functions relating to session termination without another host claiming the session ID, thereby raising possible conflict with the just terminated host. Step 159 indicates the end of the process supporting the suspended session.

Step 147 relates to identification of problems originating with the host which force suspension of a data backup copying session. Since communication with the session must occur over certain previously identified paths, should the host data processing system reset its paths (step 147), the communication paths into the session would no longer be associated with the processing unit which initiated the session. This would constitute a breach in security. The storage control unit will hold identification of the sessions for possible interrogation by the host attendant to housecleaning tasks (step 151) and terminate all sessions initiated by the host (step 153).

If a processing unit engages in an initial program load, it may interrogate a storage control unit for the sessions it owns to reinitiate its sessions or terminate them, depending upon the circumstances of the load.

The host must be able to determine that it has lost a backup operation notwithstanding its temporary unavailability. Only a host processing unit is allowed to explicitly terminate a session to avoid the possibility that two hosts may "own" one session ID.

Step 155 illustrates that monitoring for memory overload conditions or host difficulties continues for the duration of the process of physically backing up data. After a backup is completed, a session is terminated (step 157).

A backup session can fail as a result of temporary loss of the storage control unit. Such occurrences cannot be conveniently expressed in a flow chart relating operation of a storage control unit. In most cases of storage control unit failure, the host processing unit will detect the occurrence by the condition of pack change interrupts and reset notifications when it initiates an input/output operation to the storage control unit subsequent to an initial microcode load of the unit.

A host processing unit has additional security functions. The processing unit allows only privileged applications to engage time zero backup operations. This is done by classifying the time zero command set as privileged, limiting its access to approved application programs only.

Figure 5:
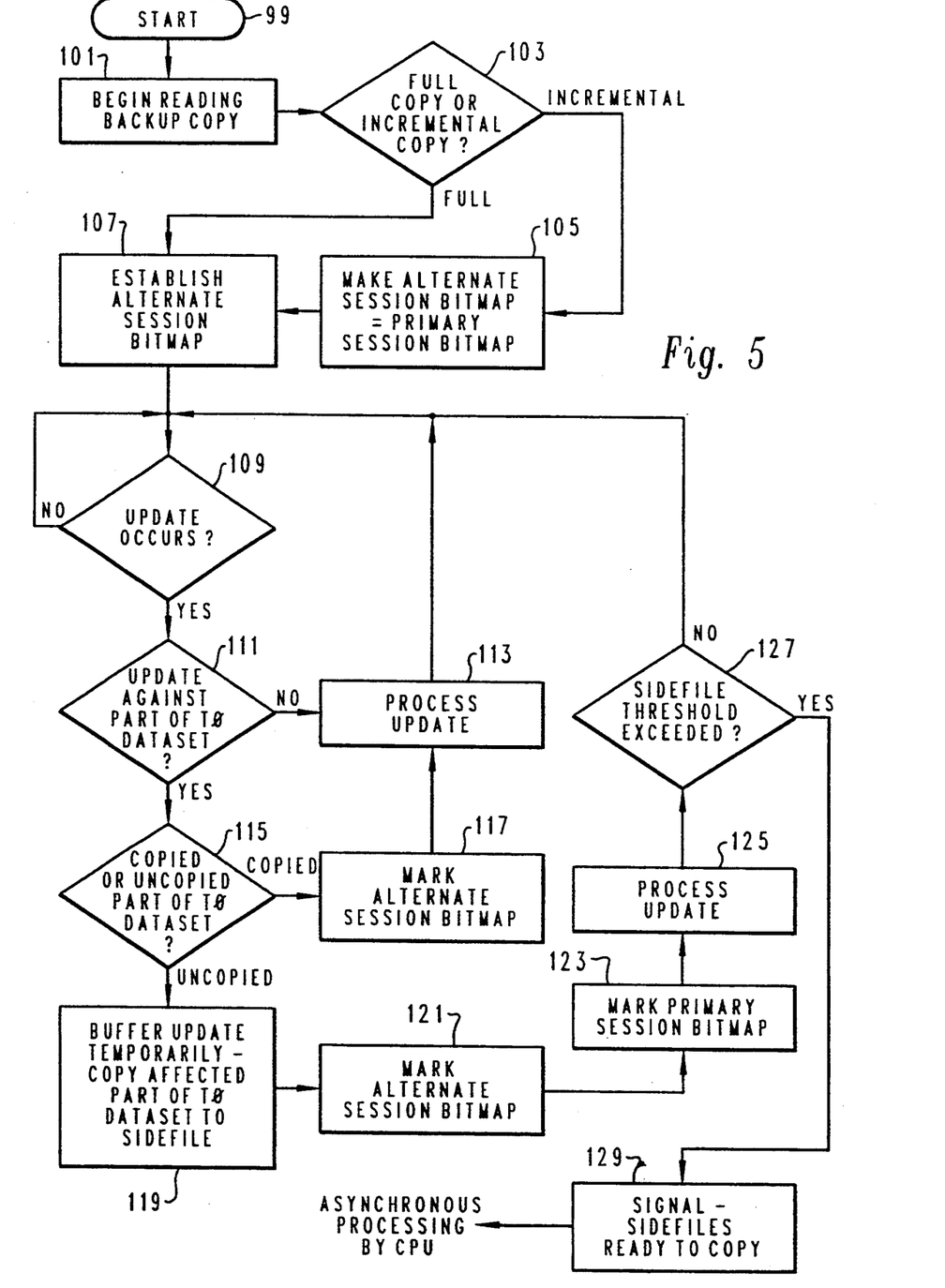
FIG. 5 is a high level logic flowchart illustrating incremental backup copying.

With reference now to FIG. 5, there is depicted a high level logic flowchart which illustrates the incremental backup copying of a dataset in accordance with the method and system of the present invention. As illustrated, the process begins at block 99 and thereafter passes to block 101. Block 101 depicts the beginning of the reading of a backup copy. The process then passes to block 103 which illustrates a determination of whether or not the backup copy is to be a "FULL" copy or a "INCREMENTAL" copy. As described above, a FULL copy is a copy of each element within a designated dataset, regardless of whether or not the data within the dataset has been previously altered. An INCREMENTAL copy is a copy which only includes those portions of the dataset which have been updated or altered since the previous backup copy occurred.

Still referring to block 103, in the event a FULL copy is to be created, the process passes to block 107 which depicts the establishment of an alternate session bit map. As will be described in greater detail herein, an alternate session bit map is utilized to track alterations or updates to portions of the designated dataset which occur after the initiation of a previous backup copy, such that an INCREMENTAL copy of only those portions of the dataset which have been altered may be created at a subsequent time. Alternately, in the event an INCREMENTAL copy is to be created, the process passes from block 103 to block 105, which illustrates the changing of the designation of the alternate session bit map to that of the primary session bit map, and the process then passes to block 107, which again illustrates the establishment of an alternate session bit map.

Thus, upon the initiation of a FULL backup copy, an alternate session bit map is created to track changes to the dataset which occur after the initiation of the full copy. Thereafter, if an INCREMENTAL copy is to be created, the previously established alternate session bit map is utilized as the primary session bit map and a new alternate session bit map is created to permit the system to track changes to the data within the dataset which occur after the initiation of the INCREMENTAL copy.

Next, block 109 illustrates a determination of whether or not an update has occurred. In the event no update has occurred, the process merely iterates until such time as an update does occur. In the event an update has occurred, the process passes to block 111. Block 111 illustrates a determination of whether or not the update initiated by an application within the data processing system is an update against a portion of the time zero dataset. If not, the process merely passes to block 113 and the update is processed in a user transparent fashion. However, in the event the update is against a portion of the time zero dataset, the process passes to block 115.

Block 115 illustrates a determination of whether or not the update is against a copied or uncopied portion of the time zero dataset. That is, an update to a portion of data within the dataset which has been copied to the backup copy and is therefore physically complete, or a portion which has not yet been copied to the backup copy. If the portion of the dataset against which the update is initiated has already been copied to the backup copy, the process passes to block 117 which illustrates the marking of the alternate session bit map, to indicate that this portion of the dataset has been altered since the previous backup copy was initiated. Thereafter, the process passes to block 113 which illustrate the processing of the update. Again, the process then passes from block 113 to block 109, to await the occurrence of the next update.

Referring again to block 115, in the event the update against the time zero dataset is initiated against a portion of the time zero dataset which has not yet been copied to the backup copy, the process passes to block 119. Block 119 illustrates the temporary buffering of the update and the copying of the affected portion of the time zero dataset to a sidefile within memory within the storage control unit (see FIG. 3). Thereafter, the process passes to block 121, which illustrates the marking of the alternate session bit map to indicate that an update has occurred with respect to this portion of the dataset since the initiation of the previous backup copy.

Next, the process passes to block 123, which illustrates the marking of the primary session bit map, indicating to the resource manager that this portion of the dataset has been updated within the external storage subsystem and that the time zero copy of this portion of the dataset is now either within subsystem storage within storage control unit 65 or within temporary host sidefile 71 which is utilized to prevent overflow of data within the subsystem storage within storage control unit 65 (see FIG. 3).

After marking the primary session bit map, the process passes to block 125 which illustrates the processing of that update. Thereafter, the process passes to block 127 which depicts a determination of whether or not the sidefile threshold within the subsystem storage of storage control unit 65 has been exceeded. If so, the process passes to block 129, which illustrates the generation of an attention signal, indicating that sidefiles within the storage control unit are ready to be copied by the processor. Of course, those skilled in the art will appreciate that a failure to copy data from the subsystem storage within storage control unit 65 may result in the corruption of the backup copy if that memory is overwritten. Referring again to block 127, in the event the sidefile threshold has not been exceeded, the process returns again to block 109 to await the occurrence of the next update.

The asynchronous copying of sidefile data from a subsystem storage within storage control unit 65 to a temporary host sidefile, or to the merged backup copy, is described in detail within the cross-referenced patent application, as well as the process by which merged copies are created which incorporate data read directly from tracked cyclic storage unit 61, data within subsystem storage within storage control unit 65 and/or data within temporary host sidefile 71.

Thus, upon reference to the foregoing those skilled in the art will appreciate that by initiating a time zero backup copy the suspension of application execution which normally accompanies a backup copy session is substantially reduced by the expedient of creating a bit map identifying each portion of data within the designated dataset to be updated and thereafter releasing the dataset for application execution. Portions of the designated dataset within the external storage subsystem are then copied on an opportunistic or scheduled basis and attempted updates to the data contained therein are deferred temporarily, until such time as the original data, as it existed as of the time of the backup copy, may be written to a sidefile for inclusion within the completed backup copy. Thereafter, the updates are written to the data within the external storage subsystem. Contamination of the data sets is prevented by securing the data backup copying process.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system of securing backup copying of designated datasets stored within at least a first storage subsystem connected to the data processing system by a storage control unit against interference from contemporaneously executing applications within one or more processing units of the data processing system, the method comprising the steps of:

responsive to initiation of a data backup session by an application executing on a processing unit, generating a unique identifier for the data backup session;

determining all member paths of a group of paths designated by the processing unit for communication between itself and the designated datasets stored within the first storage subsystem;

associating the data backup session unique identifier with the group of paths; and allowing access to the data backup session only along a member path of the group of paths associated with the data backup session unique identifier.

2. A method in a data processing system of securing backup copying of designated datasets stored within at least a first storage subsystem connected to the data processing system by a storage control unit against interference from contemporaneously executing applications within one or more processing units of the data processing system as set forth in claim 1, the method comprising the further steps of:

generating a session file for the data backup session; and responsive to a session file exceeding a limit in size, terminating the data backup session.

3. A method in a data processing system of securing backup copying of designated datasets stored within at least a first storage subsystem connected to the data processing system by a storage control unit against interference from contemporaneously executing applications within one or more processing units of the data processing system as set forth in claim 2, wherein the limit is dynamically adjusted as a function of a number of concurrent data backup sessions and the size of the concurrent data backup sessions.

4. A method in a data processing system of securing backup copying of designated datasets stored within at least a first storage subsystem connected to the data processing system by a storage control unit against interference from contemporaneously executing applications within one or more processing units of the data processing system as set forth in claim 1, the method comprising the further steps of:

responsive to the processing unit resetting all member paths of the group of paths designated initially by the processing unit, terminating the data backup session.

5. A method in a data processing system of securing backup copying of designated datasets stored within at least a first storage subsystem connected to the data processing system by a storage control unit against interference from contemporaneously executing applications within one or more processing units of the data processing system as set forth in claim 1, the method comprising the further steps of:

responsive to reinitialization of the processing unit, terminating the data backup session.

6. A method in a data processing system of securing backup copying of designated datasets stored within at least a first storage subsystem connected to the data processing system by a storage control unit against interference from contemporaneously executing applications within one or more processing units of the data processing system as set forth in claim 1, the method comprising the further steps of:

notifying the processing unit of a reinitialization of the storage control unit.

7. A method in a data processing system of securing backup copying of designated datasets stored within at least a first storage subsystem connected to the data processing system by a storage control unit against interference from contemporaneously executing applications within one or more processing units of the data processing system as set forth in claim 1, the method comprising the further steps of:

responsive to inquiry by a processing unit, returning a list of available data backup session identifiers to the processing unit.

8. A data processing system for securing data backup copying of datasets designated by an application executing on a processing unit of the data processing system and stored within at least a first storage subsystem, the backup copying occurring during concurrent execution of other applications on one or more processing units of the data processing system, comprising:

means responsive to initiation of a data backup session by an application executing on a processing unit for generating a unique identifier for the data backup session;

means for determining all member paths of a group of paths designated by the processing unit for communication between itself and the designated dataset stored within the first storage subsystem;

means for associating the data backup session unique identifier with the group of paths; and means for blocking access to the data backup session along a path not belonging to the group of paths associated with the data a backup session unique identifier.

9. A data processing system for securing data backup copying of datasets designated by an application executing on a processing unit of the data processing system and stored within at least a first storage subsystem, the backup copying occurring during concurrent execution of other applications on one or more processing units of the data processing system as set forth in claim 8, further comprising:

means for generating a session file for the data backup session;

means for determining if the session file exceeds a limit in size; and means responsive to a session file exceeding a limit in size for terminating the data backup session.

10. A data processing system for securing data backup copying of datasets designated by an application executing on a processing unit of the data processing system and stored within at least a first storage subsystem, the backup copying occurring during concurrent execution of other applications on one or more processing units of the data processing system as set forth in claim 9, further comprising means for dynamically adjusting the limit as a function of a number of concurrent data backup sessions and the size of the concurrent data backup sessions.

11. A data processing system for securing data backup copying of datasets designated by an application executing on a processing unit of the data processing system and stored within at least a first storage subsystem, the backup copying occurring during concurrent execution of other applications on one or more processing units of the data processing system as set forth in claim 8, further comprising:

means responsive to the processing unit resetting all member paths of the group of paths designated initially by the processing unit for terminating the data backup session.

12. A data processing system for securing data backup copying of datasets designated by an application executing on a processing unit of the data processing system and stored within at least a first storage subsystem, the backup copying occurring during concurrent execution of other applications on one or more processing units of the data processing system as set forth in claim 8, further comprising:

means responsive to reinitialization of the processing unit for terminating the data backup session.

13. A data processing system for securing data backup copying of datasets designated by an application executing on a processing unit of the data processing system and stored within at least a first storage subsystem, the backup copying occurring during concurrent execution of other applications on one or more processing units of the data processing system as set forth in claim 8, further comprising:

means for notifying the processing unit of a reinitialization of the storage control unit.

14. A data processing system for securing data backup copying of datasets designated by an application executing on a processing unit of the data processing system and stored within at least a first storage subsystem, the backup copying occurring during concurrent execution of other applications on one or more processing units of the data processing system as set forth in claim 8, further comprising:

means responsive to inquiry by a processing unit for returning a list of available data backup session identifiers to the processing unit.

* * * * *

UNITED STATES PATENT AND TRADEMARK OFFICE
CERTIFICATE OF CORRECTION

PATENT NO. : 5,448,718
DATED : September 5, 1995
INVENTOR(S) : Cohn et al.

It is certified that error appears in the above-indentified patent and that said Letters Patent is hereby corrected as shown below:

Column 7, line 23: insert --subsystem-- before "storage control unit 65."

Column 9, lines 25-26: delete "in accordance with the method and system of the present invention."

Signed and Sealed this

Third Day of September, 1996

Attest:

BRUCE LEHMAN

Attesting Officer

Commissioner of Patents and Trademarks